United States Patent
Taylor et al.

(10) Patent No.: US 12,005,630 B2
(45) Date of Patent: Jun. 11, 2024

(54) METHOD FOR MANUFACTURING A REINFORCED COMPOSITE PIPE USING COMPRESSION TECHNIQUES

(71) Applicant: Composite Fluid Transfer LLC, Kilgore, TX (US)

(72) Inventors: Christopher L. Taylor, Winona, TX (US); Harvey E. Svetlik, Pipe Creek, TX (US)

(73) Assignee: Composite Fluid Transfer LLC, Kilgore, TX (US)

( * ) Notice: Subject to any disclaimer, the term of this patent is extended or adjusted under 35 U.S.C. 154(b) by 92 days.

(21) Appl. No.: 17/490,730

(22) Filed: Sep. 30, 2021

(65) Prior Publication Data

US 2023/0095131 A1  Mar. 30, 2023

(51) Int. Cl.
*B29C 63/06* (2006.01)
*B29C 55/00* (2006.01)
(Continued)

(52) U.S. Cl.
CPC ............ *B29C 63/06* (2013.01); *B29C 55/005* (2013.01); *B29C 55/30* (2013.01); *C09J 7/243* (2018.01);
(Continued)

(58) Field of Classification Search
CPC .... C09J 7/243; C09J 9/00; C09J 11/04; B29C 63/06; B29C 55/005; B29C 55/30; B29K 2101/12; B29L 2023/22
See application file for complete search history.

(56) References Cited

U.S. PATENT DOCUMENTS 1,714,400 A   12/1875   Smith
2,409,865 A   10/1946   Howard
(Continued)

FOREIGN PATENT DOCUMENTS

CH       701365 A1    12/2010
DE     3818582 A1    12/1989
(Continued)

OTHER PUBLICATIONS

Australian Examination Report No. 1 for Application No. 2013249208 dated Jan. 17, 2017, (3 pages).
(Continued)

*Primary Examiner* — Vishal I Patel
(74) *Attorney, Agent, or Firm* — Clark Hill PLC; John A. Tang; David Gorski

(57) ABSTRACT

A process for manufacturing pipes using thermoplastic pipe and "tape" (continuous fiber, fully wetted in a similar thermoplastic as the pipe) that embeds its fibers into pipe surface. The thermoplastic pipe is mechanically compressed prior fiber tape being applied. Outer diameter reduction of the pipe is at least partly maintained by the fiber tape being tightly wrapped around the pipe immediately after compression causes the pipe to contract. Then, an external heat source is applied to the pipe causing the thermoplastic to melt and the pipe to undergo thermal expansion. Fibers stretch less and are embedded into the molten layer of the pipe, creating a permanent bond between the fibers and the pipe. Individual pipes may be joined using couplers or butt welds.

11 Claims, 6 Drawing Sheets

(51) Int. Cl.
*B29C 55/30* (2006.01)
*C09J 7/24* (2018.01)
*C09J 9/00* (2006.01)
*C09J 11/04* (2006.01)
*B29K 101/12* (2006.01)
*B29L 23/00* (2006.01)

(52) U.S. Cl.
CPC .............. *C09J 9/00* (2013.01); *C09J 11/04* (2013.01); *B29K 2101/12* (2013.01); *B29L 2023/22* (2013.01)

(56) References Cited

U.S. PATENT DOCUMENTS

| | | |
|---|---|---|
| 2,470,359 A | 5/1949 | Mclean |
| 3,390,704 A | 7/1968 | Woodell |
| 3,481,369 A | 12/1969 | Ganahl |
| 3,522,122 A | 7/1970 | Ganahl |
| 3,532,579 A | 10/1970 | Havens |
| 3,652,375 A | 3/1972 | Johnson |
| 3,988,188 A | 10/1976 | Johansen |
| 4,010,054 A | 3/1977 | Bradt |
| 4,014,370 A | 3/1977 | McNulty |
| 4,043,857 A | 8/1977 | Byrne |
| 4,258,756 A | 3/1981 | Gilman |
| 4,537,225 A | 8/1985 | McNulty |
| 4,589,562 A | 5/1986 | Fawley |
| 4,702,498 A | 10/1987 | Mueller |
| 5,634,672 A * | 6/1997 | Stack ............... F16L 59/20 264/269 |
| 5,638,870 A | 6/1997 | Takada |
| 5,683,530 A | 11/1997 | Fawley |
| 5,695,702 A | 12/1997 | Niermeyer |
| 5,839,475 A | 11/1998 | Maine |
| 6,016,845 A | 1/2000 | Quigley |
| 6,022,054 A | 2/2000 | Hemphill |
| 6,286,558 B1 | 9/2001 | Quigley |
| 6,508,276 B2 | 1/2003 | Radlinger |
| 6,773,773 B2 | 8/2004 | Hauber |
| 6,889,715 B2 | 5/2005 | Fraser |
| 7,426,942 B2 | 9/2008 | Rice |
| 7,600,537 B2 | 10/2009 | Bhatnagar |
| 8,034,211 B2 | 10/2011 | Andersen |
| 8,147,937 B2 | 4/2012 | Brisson |
| 8,361,580 B2 | 1/2013 | Stark |
| 8,440,034 B2 | 5/2013 | Pallini |
| 8,944,113 B2 | 2/2015 | Shafer |
| 2001/0048223 A1 | 12/2001 | Campbell |
| 2002/0054968 A1 | 5/2002 | Hauber |
| 2002/0140231 A1 | 10/2002 | Poole |
| 2002/0162597 A1 | 11/2002 | Radlinger |
| 2003/0201060 A1 | 10/2003 | Hauber |
| 2003/0209312 A1 | 11/2003 | Hauber |
| 2004/0007279 A1 | 1/2004 | Yamaguchi |
| 2006/0284420 A1 | 12/2006 | Dole |
| 2008/0036198 A1 | 2/2008 | Roberts-Moore |
| 2009/0091128 A1 | 4/2009 | Cloos |
| 2010/0024843 A1 | 2/2010 | Gryta |
| 2011/0083765 A1 | 4/2011 | Stark |
| 2012/0291903 A1 | 11/2012 | Ekelund |
| 2013/0276932 A1 | 10/2013 | Taylor |
| 2014/0375047 A1 | 12/2014 | Jones |
| 2016/0290534 A1 * | 10/2016 | Taylor ............ B29C 53/58 |
| 2018/0328521 A1 | 11/2018 | Taylor |

FOREIGN PATENT DOCUMENTS

| | | |
|---|---|---|
| GB | 685573 A | 1/1953 |
| GB | 1451190 A | 9/1976 |
| JP | 03149485 A | 6/1991 |
| WO | 2009048470 | 4/2009 |
| WO | 2010096935 A1 | 9/2010 |

OTHER PUBLICATIONS

Chile Examination Report for Application No. 201402824 dated Jul. 17, 2017, (6 pages).
English translation of Eurasian Office Action for Application No. 201491899/31 dated Dec. 22, 2016 (2 pages).
Eurasian Office Action for Application No. 201491899/31 dated Dec. 22, 2016 (1 page).
Flowtite Pipe Systems Irrigation Catalogue, date unknown. (16 pages).
Mexico Office Action for Application No. MX/a/2014/012690 dated May 22, 2017, (4 pages).
Mexico Office Action issued for Application No. MX/a/2014/012690 dated Feb. 7, 2018, (3 pages).
Patent Cooperation Treaty International Search Report and the Written Opinion mailed Jul. 26, 2013, International Application No. PCT/US2013/037180, (8 pages).
Ticona Performance Driven Solutions, Preliminary Data, Celstran® CFR-TP HDPE GF70-01, date unknown, (1 page).
United Arab Emirates Search Report issued for Application No. 1129/2014 (dated unknown), (3 pages).
United Arab Emirates Examination Report issued for Application No. 1129/2014 (dated unknown), (4 pages).
Valéron Strength Films, V-Max® Synthetic Paper, copyright 2009, (1 page).
Patent Cooperation Treaty International Search Report and the Written Opinion mailed Jan. 5, 2023, International Application No. PCT/US2022/045333, (12 pages).

* cited by examiner

METHOD FOR MANUFACTURING A REINFORCED COMPOSITE PIPE USING COMPRESSION TECHNIQUES

BACKGROUND OF THE DISCLOSURE

1. Field of the Disclosure

This disclosure relates to a method for manufacturing reinforced thermoplastic pipes used in transporting fluids and gasses.

2. Description of the Related Art

Transporting fluids (or even gasses), such as water and chemicals can be costly and time consuming. For example, in today's energy scarce environment, efficient oil and gas recovery techniques are vital. One means for inducing recovery is using an induced hydraulic fracturing method. "Fracturing fluids" or "pumping fluids" or "fracking fluids" consisting primarily of water and sand are injected under high pressure into the producing formation, creating fissures that allow resources to move freely from rock pores where it is trapped. Chemicals can be added to the water and sand mixture (creating a slickwater) to increase the fluid flow. Fractures provide a conductive path connecting a larger area of the formation to the well, thereby increasing the area from which natural gas and liquids can be recovered from the targeted formation.

Water for the fracturing method is supplied to the recovery site (and perhaps the fluid's byproduct from the fracturing method, known sometimes as flowback water, removed from the site) by a piping system. The piping system can consist of hundreds or thousands of yards of pipes. The piping system could include hundreds of pipes joined together by couplers to form the overall piping system. Although technically effective, environmentalists are concerned that fracking fluids may leak from the piping system thus causing damage to the environment. Consequently, many areas where oil and gas reservoirs exist may not be exploited due to environmental concerns.

Traditional pipes used for transporting fluids, such as water, are made of steel or other metals, such as aluminum. More recent pipes are composed of a plastic material such as high-density polyethylene (HDPE). HDPE pipes have some advantages over metal pipes, including lower costs, abrasion resistance, corrosion resistance, high impact resistance and greater flexibility (which are especially useful over uneven terrains). These pipes are durable for gas, chemical and water applications and may be reused.

For example, a typical Yelomine™ pipe has a weight density of 300 pounds (lbs.) per 30 feet (ft.) of length. This pipe has moderate durability but needs support structure (such as support blocks) during fluid transport use.

A typical aluminum pipe used in today's fluid transport system is light weight with a weight density of 90 lbs./30 ft. of length. However, it is not very durable and like the Yelomine™ pipe requires a support system during the fluid transfer. It has a pressure to weight ratio of a little more than 1.

Although HDPE pipes are in current use, such current use includes thick-walled HDPE pipes, such as a DR9 HDPE pipe. To ensure the integrity of the piping system under high fluid transport pressure, the walls of the HDPE pipes are typically more than an inch thick. For example, the DR9 HDPE pipe has a wall thickness of 1.11 inches. The DR9 HDPE pipe has a weight density of a whopping 650 lbs./30 ft. It is highly durable but costs nearly 3 times more than an aluminum pipe. The pipes are difficult to transport in rough, uneven or forest terrains. Often, trucks or other mechanical movers are needed to transport the heavy pipes for construction of the system. These pipes are typically buried and then are not reusable. The pressure to weight ratio of the DR9 HDPE pipe is less than 0.4. Consequently, although thick-walled HDPE pipes may be more durable then aluminum or Yelomine™ pipes, current thick-walled HDPE pipes in industrial use remain very heavy. Furthermore, coupling these individual thick-walled pipes to create the piping system may be slow and burdensome. That is, butt fusing systems are often used to join thick-walled pipes. The use of the butt fusing system is often time consuming due to its process and the heavy equipment needed to be transported to the installation site for the connection of the pipes. In addition, as a result of environmental concerns, a couplerless piping system or a system with few couplers is desirable since most leaks occur at a coupler or joint. Consequently, the use of current thick-walled HDPE pipes may not be feasible in transporting liquids or gas over a great distance or through rough terrain under high pressure.

One known method of contracting a thin-walled HDPE pipe is by induce thermal contraction through cooling and then wrapping the contracted pipe with fiberglass tape, as discussed in U.S. Pat. No. 10,036,488. However, cooling HDPE pipe from ambient to near freezing temperatures requires substantial amounts of energy and equipment to only provide a marginal degree of contraction, which limits the number of wrap layers that may be applied for a given diameter. Further, exposure of cooled pipe to ambient conditions can result in condensation of water vapor in the air forming liquid water on the outer surface of the pipe before and during the fiberglass wrap process, which can trap liquid water between the layers of wrap and impact the bonding of the tape.

What is needed is a method for producing lightweight and cost-effective HDPE piping that can, among other things, withstand the environment and gas and fluid pressures of current oil and gas recovery methods that does not require cooling prior to wrapping and has superior contraction characteristics to cooling methods. The novel system needs to be designed and constructed for easy transport and installation. The novel system needs to provide a high flow and a high strength solution. The system needs to allow for minimal blocks or a support system in an above ground application. Rather, the novel piping system can lie on the ground during use or span voids. However, below ground installation is not restricted by the novel system. Since the novel system can be made with a thermoplastic, such as HDPE, the piping system may be resistant to theft (since metal pipes are often stolen).

In addition, the novel system may be used for other applications, such as water irrigation or temporary supply of water or removal of waste during emergencies or gas and chemical transport.

BRIEF SUMMARY OF THE DISCLOSURE

In accordance with the present disclosure, a mechanical piping system and a method for manufacturing piping elements for use in the mechanical piping system is disclosed. As disclosed herein, the system incorporating aspects of the present disclosure may include a pipe, wherein the pipe is made of a thermoplastic material, such as, but not limited to, high-density polyethylene (HDPE). During the construction process, the pipe is mechanically compressed and then wrapped with a thermoplastic fiber tape. The tape is made with continuous and taut fibers wherein the fibers can be made from glass, carbon or synthetic fiber (such as Kevlar™ fibers). After mechanical compression, the pipe will naturally expand and apply pressure against the restraint provided by the tape. The tape and pipe are heated by a heat source causing the tape and the surface of the pipe to become molten, whereby the fibers of the tape become bonded to and embedded in the pipe. When heated and later cooled, the tape bonds (creating a homogenous or monolithic bond) to the pipe creating a reinforced pipe. Ends of the pipe may be further wrapped by the tape to add reinforcement to the pipe's ends. The reinforced pipe may then be wrapped or extruded over with a UV protective and abrasion resistant film. Should the pipe need to endure higher pressures, a second wrapping or more wrappings at ambient temperature of the thermoplastic fiber tape is applied, heated and cooled before the UV/abrasion resistant film is applied. The system may also include a coupling connector, wherein the interior of the connector engages with the exterior of the end of the pipe. Mechanical or electrical forces are used to secure the pipe's end to the coupling connector. The pipe may also be butt fused in the field.

The system and method disclosed herein is technically advantageous because it creates a mechanical piping system for use in high pressure application, including high pressure water transport, water irrigation or temporary or permanent water supply and removal applications. The system and method are further advantageous because the piping elements for high pressure fluid and gas transport are lighter (allowing for 2 men delivery and construction) and more durable than in existing piping systems and are also less prone to leakage. The system and method are also advantageous in that they incorporate time saving elements, making deployment and or removal of the piping system easier and faster than in current applications. Other technical advantages will be apparent to those of ordinary skill in the art in view of the following specification, claims, and drawings.

One embodiment according to the present disclosure includes a method for manufacturing a reinforced pipe system for transporting a fluid, including the steps of: contracting a thermoplastic pipe using a mechanical compression device; wrapping or extruding a first fiber tape on a surface of the pipe, said first fiber tape having continuous taut fibers; securing ends of the first fiber tape to the ends of the pipe using a first heat source; warming the first fiber tape and pipe using a second heat source; embedding taut fibers into the pipe as the pipe is warmed; and bonding the first fiber tape to the pipe as the tape and pipe reach a thermal equilibrium. The pipe may be thin or thick walled up to the maximum wall thickness that can be extruded. The thermoplastic material may include one of: high-density polyethylene, polypropylene, and polyvinylidene fluoride. The first fiber tape may include continuous uni-directional fiberglass fibers. The first fiber tape may be a polyethylene tape. The first heat source may be an iron. The method may include a further step of wrapping or extruding a second fiber tape over a surface of the first fiber tape. In some instances, the first fiber tape and second fiber tape may be made of polyethylene material. The method may further include a step of wrapping or extruding a film over the surface of the second fiber tape. The film may be a UV protective film or abrasion resistant film. The mechanical compression may be produced by drawing the thermoplastic pipe through a die.

Another embodiment of the present disclosure includes an apparatus for transporting a fluid, including: a compressed thermoplastic pipe with an outer surface; and a first fiber tape layer surrounding the circumference of the pipe for substantially all of a length of the pipe; wherein the first fiber tape layer has continuous taut fibers and is melted into the outer surface due to the heating and expansion of the pipe. The thermoplastic material may include one of: high-density polyethylene, polypropylene, and polyvinylidene fluoride. The continuous taut fibers include continuous uni-directional fiberglass fibers. The apparatus may include a second fiber tape wrapped around the first fiber tape. The apparatus may include additional layers of fiber tape wrapped around the second fiber tape layer. The first fiber tape and the second fiber tape may include polyethylene material. The apparatus may also include a layer of UV protective film disposed or extruded on the second fiber tape layer or a layer of abrasion resistant film disposed on the second fiber tape layer.

BRIEF DESCRIPTION OF THE DRAWINGS

A better understanding of the present disclosure can be obtained with the following detailed descriptions of the various disclosed embodiments in the drawings, which are given by way of illustration only, and thus are not limiting the present disclosure, and wherein.

DETAILED DESCRIPTION OF THE DISCLOSURE

Figure 2:
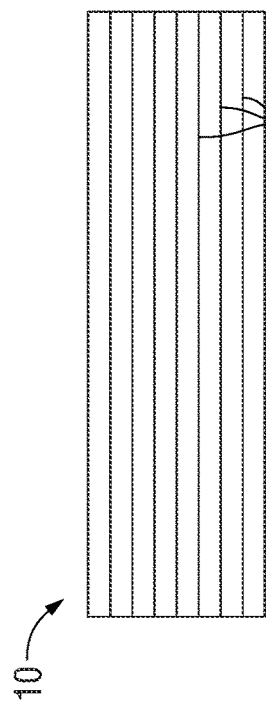
FIG. 2 is a top view of a prior art thermoplastic fibered tape.
Figure 1:
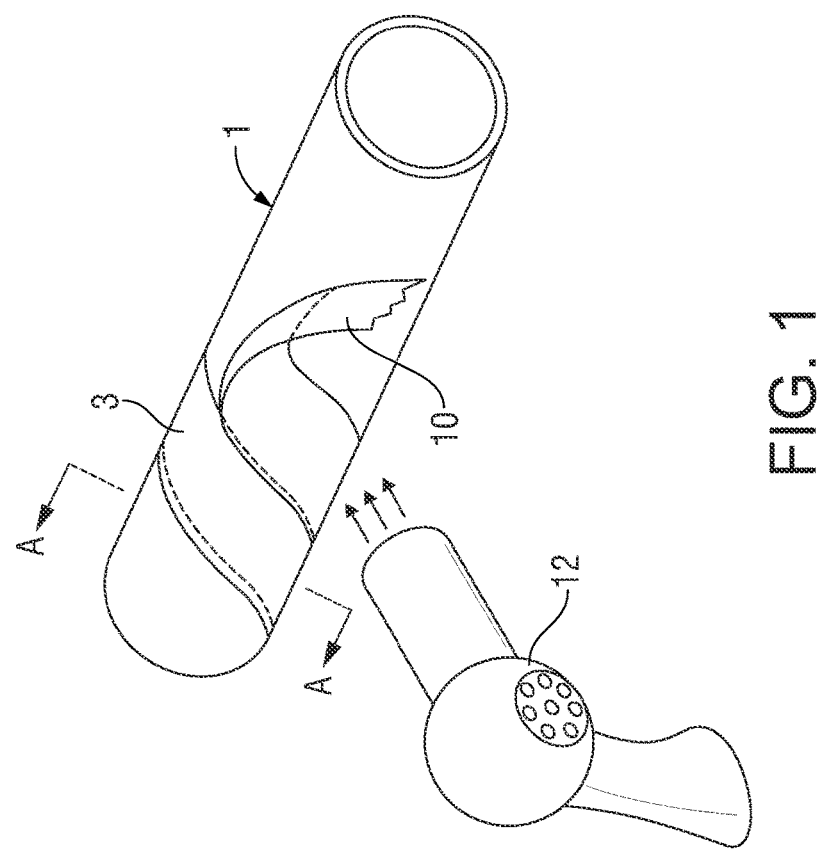
FIG. 1 is a perspective view of a tape weaved around a thermoplastic pipe according to the present disclosure.

In FIG. 1, a thermoplastic pipe or tube 1 is shown. In one embodiment according to the present disclosure, the pipe 1 is a thermoplastic pipe. Suitable thermoplastic pipe materials may include, but is not limited to, one of: high-density polyethylene (HDPE), polypropylene, and polyvinylidene fluoride (PVDF). For reinforcement, the pipe 1 is wound with a fiber tape 10. In one embodiment, the tape 10 is made of a similar material to the pipe, such as a high-density polyethylene thermoplastic tape, polypropylene tape, and polyvinylidene fluoride tape. The material of the tape 10 may be selected to match the material of the pipe 1 to ensure a close or common melting point between the tape 10 and the pipe 1. The tape includes continuous fibers 15 that in one embodiment, as shown in FIG. 2, are taut and run along the length of the tape. Such tapes, such as fiberglass HDPE tapes, are manufactured by Ticona Engineering Polymers under the brand name Celstran™ (Model no. CFR-TP HDPE GF70-01). In one embodiment, the tape is made of 70 percent fiberglass by weight and is a foot in width. Other widths such as 6 inches are contemplated. The fibers are continuously run (uni-directional) along the tape and are taut.

The pipe 1 is laid on a support platform and is mechanically compressed to compact the pipe 1. In some embodiments, the mechanical compression may be done by drawing the pipe 1 through mechanical compression device 27, such as a die or other tubular drawing device, to compact the pipe (See FIG. 11). The degree of compaction determines the available thickness of fiber tape 10 that may be added to the pipe 1. The degree of compaction is limited such the pipe 1 does not undergo permanent deformation. In some instances, drawing a pipe 1 though the compression device 27 may compact the diameter by up to 13 percent. During the period immediately after compaction, the pipe 1 will begin to expand back to its original diameter, and during this expansion period fiber tape 10 may be wrapped around the circumference of the pipe 1 in order to prevent expansion back to the original diameter. By controlling the expansion, more or less diameter may be made available for additional layers for tape 10.

As the pipe 1 is rotated, the tape 10 (generally at ambient room temperature) may be applied to the pipe 1 to create a single layer of tape 10 over the pipe 1. To ensure complete coverage of the pipe 1 using a minimum amount of tape 10 (to reduce weight of the overall pipe), the tape 10 is applied securely in a barber pole fashion where some of the tape may overlap creating an overlap area 3. A heat source (such as an iron) (not shown) is used to secure the ends of the tape 10 to the outer surface of the pipe 1 to ensure that the tape 10 is tautly wound (without slack) around the pipe 1. The tape 10 and the pipe 1 are then heated by the same or another heat source 12 to a temperature to create a homogenous or monolithic bond. In one embodiment, the heat source 12 heats the tape 10 and the pipe 1 to a surface temperature where by the outer surface of the pipe 1 becomes molten as does the tape 10. For HDPE materials, this temperature may be approximately 310 degrees F. The thermoplastic materials of both the tape and pipe melt creating a homogenous or monolithic bond. During the heating process, the pipe 1 expands due to thermal expansion. Since the tape 10 is securely wrapped over the pipe 1 and the fibers 15 are continuous and taut, the fibers 15 of the tape 10 penetrate and embed itself to the pipe 1 as the pipe expands. The more compact the pipe initially, the more expansion force is available to embed the fibers 15 into the pipe 1. During the expansion, while the surface of the pipe 1 is molten, the fibers 15 may be pre-stressed uniformly. The temperature for bonding may be selected so that both the tape 10 and the pipe 1 become molten with a viscosity low enough for the fibers 15 to migrate into the surface of the pipe 1 and a viscosity high enough that the pipe 1 surface does not drip or run under pressure from the tape 10.

Figure 3:
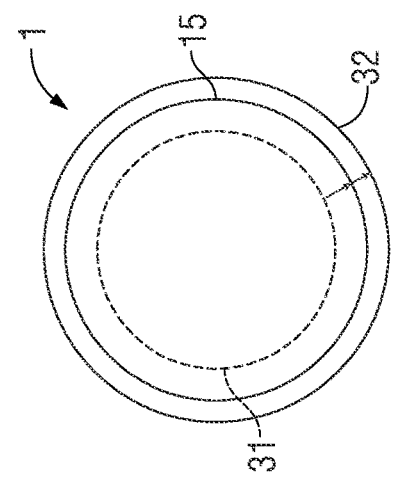
FIG. 3 is a sectional view of the thermoplastic pipe along line A-A of FIG. 1 according to the present disclosure.

In FIG. 3, a cross sectional view of the thermoplastic pipe along line A-A of FIG. 1 is shown. When compacted, the pipe 1 has a smaller outer diameter 31. Once free of the compaction source, the pipe's outer diameter 32 expands as the pipe 1 reverts to its original shape. The taut fibers 15 of the tape 10 become embedded into the pipe 1 as the pipe expands. Once the tape 10 and the pipe 1 cool to the ambient temperature creating a homogenous or monolithic bond, the fibers 15 are securely embedded in the pipe 1 to form pipe 25. The pipe 25 is reinforced by the fibers 15 and the pipe 25 can now withstand the higher pressures and other factors.

Figure 4:
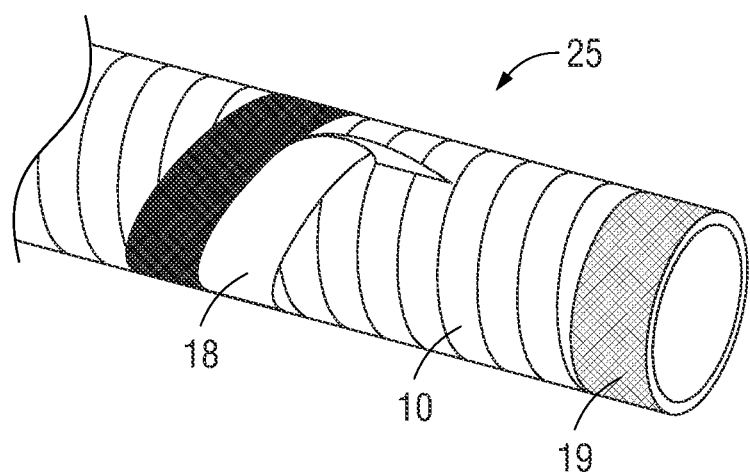
FIG. 4 is a perspective view of a thermoplastic pipe wrapped with thermoplastic fibered tape according to the present disclosure.

As shown in FIG. 4, for further reinforcement, a second layer of fibered tape 18 may be applied to the pipe 25 in the opposite direction as the first layer of tape 10 (creating a crisscrossing pattern) and forming pipe 40. Additional layers of the fibered tape may be added to the pipe 1 for additional reinforcement. Furthermore, in one embodiment, both ends of the pipe 25 are reinforced by application of an additional fiber tape 19. The tape 19 is snugly and securely wrapped perpendicular to the center axis of the pipe 25. In one embodiment, the tape 19 is tautly wrapped several times around the pipe 25 creating reinforced areas of the ends of the pipe 25 of approximately 1 to 2 ft. in length. In some embodiments, the heating of the pipe 1 is not performed until the second fiber tap layer 18 and additional tape layers 19 are added, thus the bonding may be performed layer by layer or with multiple layers. Thus, pipe 40 may be manufactured from pipe 1 without an intermediate manufacturing of pipe 25 as would be understood by a person of ordinary skill in the art.

Figure 5:
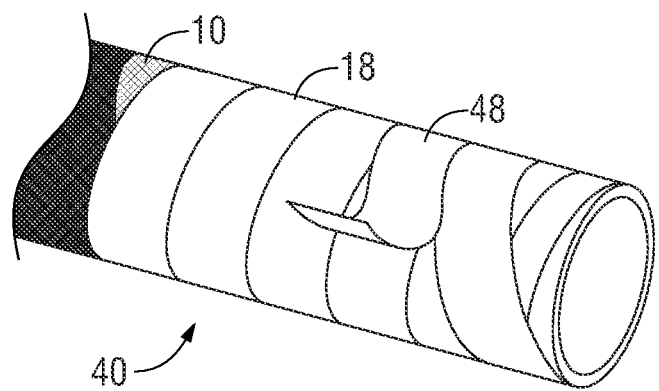
FIG. 5 is a perspective view of a UV protective/Abrasion resistant tape applied to a thermoplastic fibered tape that is wrapped around a thermoplastic pipe according to the present disclosure.

Next, a UV protective and abrasion resistant film 48 may be applied to the pipe 1. One such film is manufactured by Valeron of Houston, Texas under the brand name V-Max™. As shown in FIG. 5, typically at ambient temperature (e.g., around 72 degrees F.) and a dry environment (in one embodiment, the relative humidity is around 30), a UV protective/abrasion resistant film 48 is applied over the second layer fiber tape 18 and reinforced end tape 19 (not shown) in a similar barber poll pattern or extruded as a tube around the fiber wrapped pipe 40. However, similar to the directions of the first layer of tape 10 (shown in FIG. 3 for illustrative purposes, but generally would be covered by the second layer 18) and the second layer fiber tape 18, the UV/abrasion resistant film 48 would be applied on the pipe 40 against the direction of the second tape 18 (creating a crisscross pattern between the second layer 18 and UV/abrasion resistant tape 48). A heat source (not shown) is used to bond the film 48 to the fiber tape 18 of the pipe 40. In one embodiment, the film 48 has a width of 12 inches.

Figure 6:
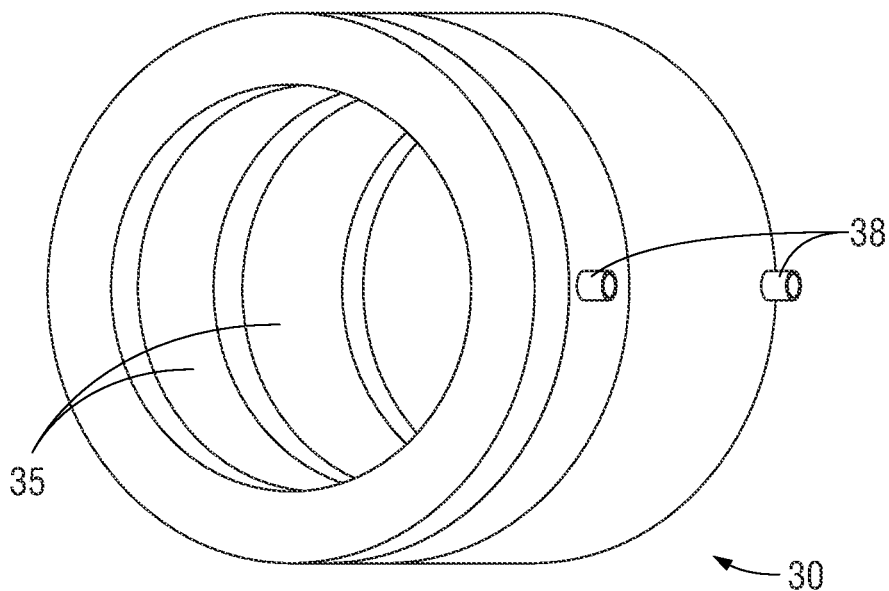
FIG. 6 is a perspective view of a prior art coupler for joining thermoplastic pipes.

The novel pipe 40 is typically 30 to 50 feet in length. Thus, in one embodiment, a coupler is used to join various sections of the pipe 40 to create the piping system. An electrostatic fusion coupler 30 is shown in FIG. 6. One exemplary coupler is manufactured by Integrity Fusion Products, Inc. of Georgia. The coupler 30 has inner diameter dimensions to allow the joining of various pipes 40. The coupler 30 has internal contact areas 35 where the outer surfaces of pipes meet up and bond with the inner surfaces of the coupler 30. Electrical ports 38 are provided to allow the entry of electrical wires to the contact areas 35.

Figure 7:
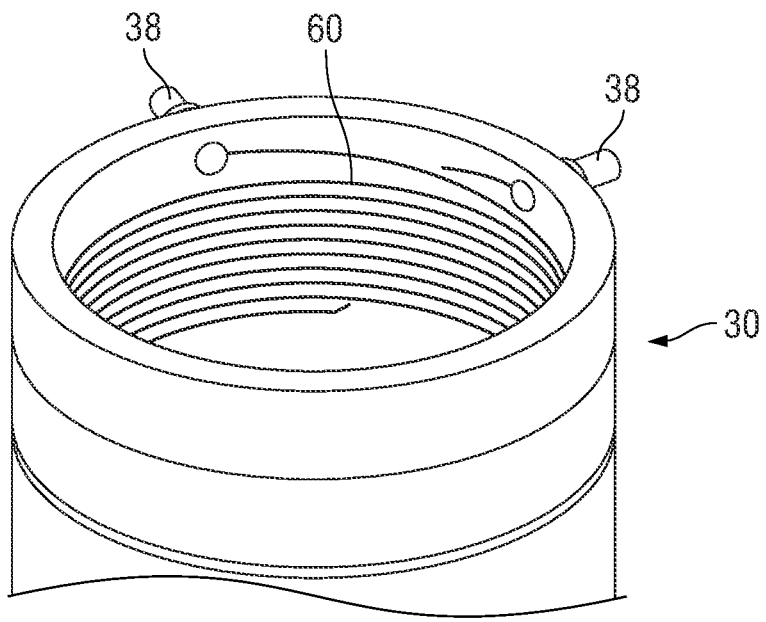
FIG. 7 is a perspective view of a prior art electronic fusion coupler.

FIG. 7 shows internal heating elements of the coupler 30. Heating elements 60 are wound within the internal surface of the coupler 30 creating the contact area 35. As an electrical current is applied to the elements 60, the resulting heat fuses the coupler 30 to the pipe 40.

Since the pipe 40 has been reinforced with the tapes 10 and 18 and UV protective/abrasion resistant film 48, the pipe, tapes and film may not effectively bond with the inner surface of the coupler 30.

Figure 8:
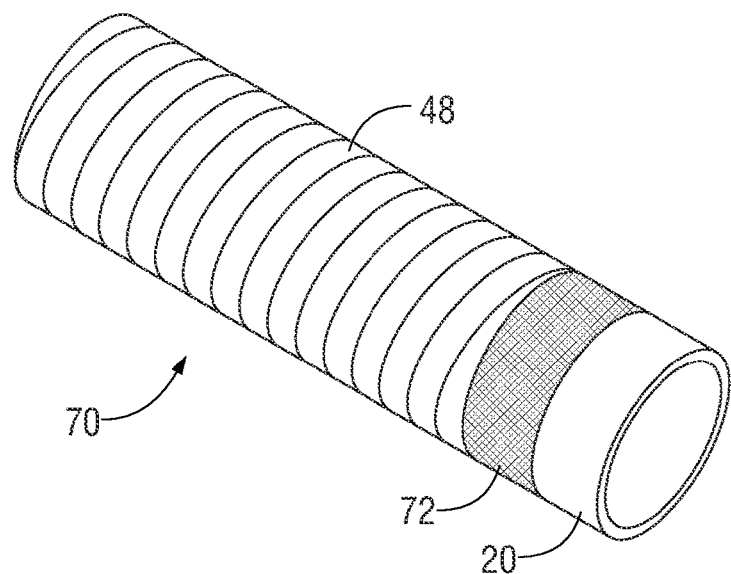
FIG. 8 is a perspective view of a thermoplastic pipe with an exposed area according to the present disclosure.

FIG. 8 shows a perspective view of the reinforced pipe 70 according to the present disclosure. An end of the reinforced pipe 70 includes an exposed area 20 where the fiber tapes 10, 18 (not shown) and the UV protective/abrasion resistant film 48 have been removed. The exposed area 20 is the original pipe. In one embodiment, the exposed area is about 4⅞ inches in length. Removal of the tapes 10, 18 and the film 48 in the exposed area 20 can be done in many ways. In one embodiment, the tapes 10, 18 and the film 48 are scraped from the pipe 70 using a mechanical scrapper.

Figure 9:
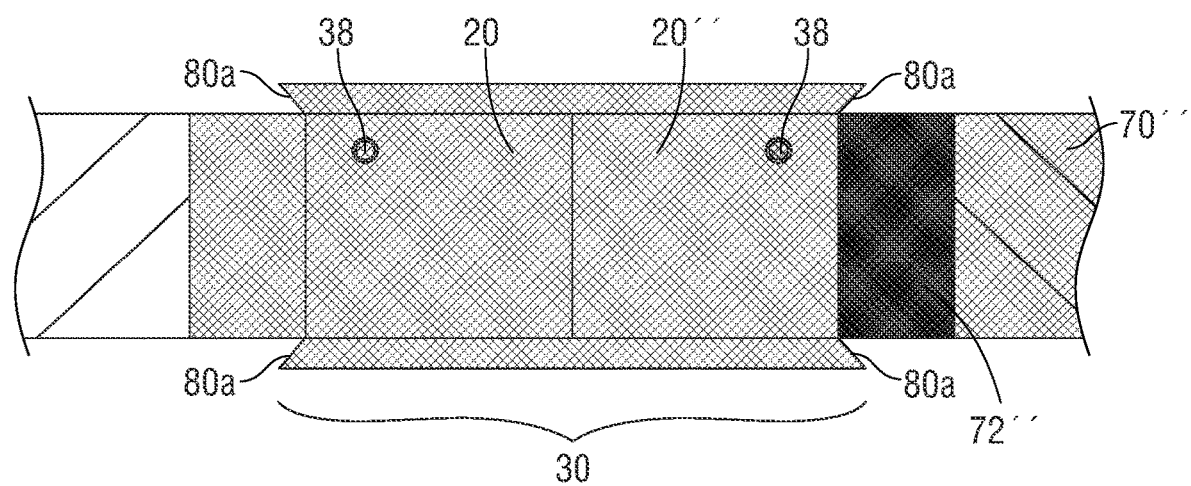
FIG. 9 is a side view of an electronic fusion coupler joining thermoplastic pipes according to the present disclosure.

FIG. 9 shows a side view of two pipes joined by a coupler according to the present disclosure. The pipes 70 and 70" are inserted into the coupler 30. Electrical ports 38 allow heating wires (not shown) to be wound to the internal surface of the coupler 30. The exposed areas 20 and 20" of the outer surfaces of pipes 70 and 70", respectively, are in contact with the heating surface of the coupler 30. As an electrical current is apply to the wires, the surfaces of pipes 70 and 70" are bonded with the internal surfaces of the coupler 30 effectively joining the pipes 70 and 70" together for fluid transport. Since the pipes 70 and 70" include reinforced ends 72 and 72", in one embodiment, the ends of the coupler 30 include beveled ends 80a along the lip of the coupler to allow the reinforced ends 72 and 72" to fit snugly up against the coupler 30. In one embodiment, the angle for the bevels is approximately 22 degrees from the horizontal.

Other coupling means can be used with the pipes. In another embodiment, a re-usable two section EF coupler can be used to join the reinforced thermoplastic pipes. Thus, a thermoplastic pipe can be re-used without the need to cut the pipe from the couplers. The length of the pipes is not shortened thus allowing additional re-uses of the pipes.

Figure 10A:
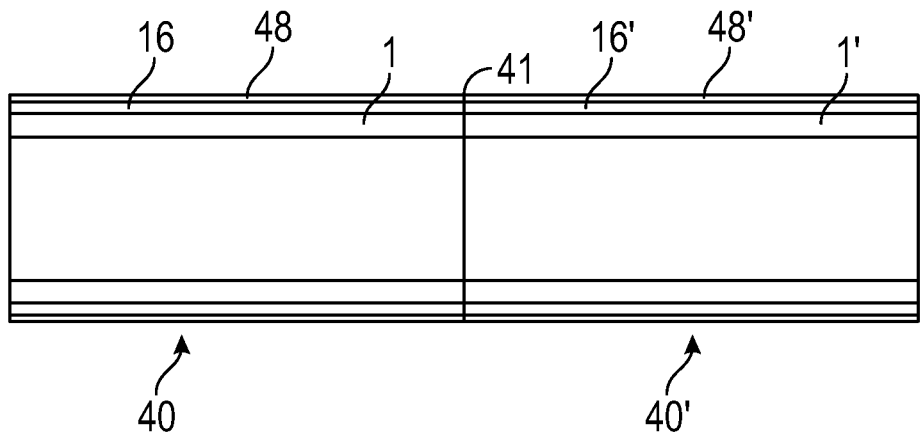
FIG. 10a is a side view of thermoplastic pipes joined by a butt weld according to the present disclosure.

FIG. 10a shows a side view of two pipes 40, 40' with film 48 joined by butt welding according to the present disclosure. Each of the pipes 40, 40' includes the pipe 1, 1' and a fiber layer 16, 16'. The fiber layer 16 for each may include a first layer 15 and optional second layer 18 and optional additional layer(s) 19. The pipes 40, 40' are joined by a butt weld 41 formed by heating one or more of the adjacent ends of the pipes 40, 40'.

Figure 10B:
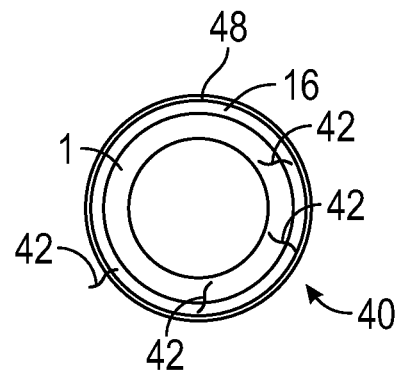
FIG. 10b is an end view of a thermoplastic before joining by a butt weld according to the present disclosure.

FIG. 10b shows an end view of the pipe 40 just prior to the application of the butt weld 41 in FIG. 10a. In some instances, stray fibers 42 from the fiber layer 16 may extend beyond the fiber layer 16. Prior to butt welding the pipe 40, the fibers 42 must be removed so as not to interfere with the continuity and effective seal of the butt weld 41.

The pipe 40, 70 is reusable. Typically, the initial length of the pipe 70 is 30 to 50 feet in length. To reuse the pipe 70 and depending on the type of coupler, the pipe is cut from the coupler 30. Ends of the cut pipe are scraped of the tapes 10, 18 and 48 to once again create an exposed area for further coupling of the pipe 70 at another site. The scraping of the tapes from the pipe's 70 outer surface ends can be done in the field, thus allowing for quick turnaround and reuse. Application of the novel system can include transport of water during fracturing operations, removal of waste water from oil and gas sites or temporary supply of water or removal of waste water during emergency situations.

For example, in one embodiment, the novel piping system can transport 150 bbls/minute with a 10.5" inner diameter (ID)/11" outer diameter thermoplastic pipe and 200 PSI with 1.5 SF. Furthermore, repair and reuse of the novel pipes are possible at a lower cost than traditional piping systems. The novel system can be used above ground and without traditional support blocks or other support platforms in a piggy back configuration. The clearing of an area for the laying of the novel piping system may not be needed. The flexible piping system can be used in forests or other high-density areas with obstacles. Since the pipes are made of thermoplastic materials, threat of theft is reduced (in comparison with metal pipes).

Figure 11:
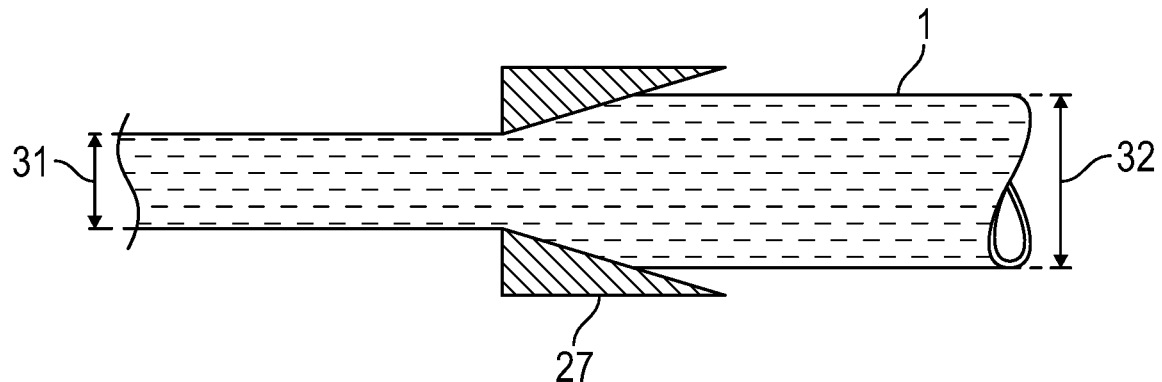
FIG. 11 is a diagram of a thermoplastic pipe being drawn through a mechanical compression device according to the present disclosure.

FIG. 11 shows a diagram of the thermoplastic pipe 1 being drawn the mechanical compression device 27 (i.e. die) to compact the pipe 1. The original pipe outer diameter 32 is reduced to compacted outer diameter 31 based on the size of the opening of the mechanical compression device 27. The degree of compaction may be selected such that the pipe 1 is compacted but does not suffer irreversible deformation. In some embodiments, the degree of compaction may be between about 1 and about 13 percent.

Figure 12:
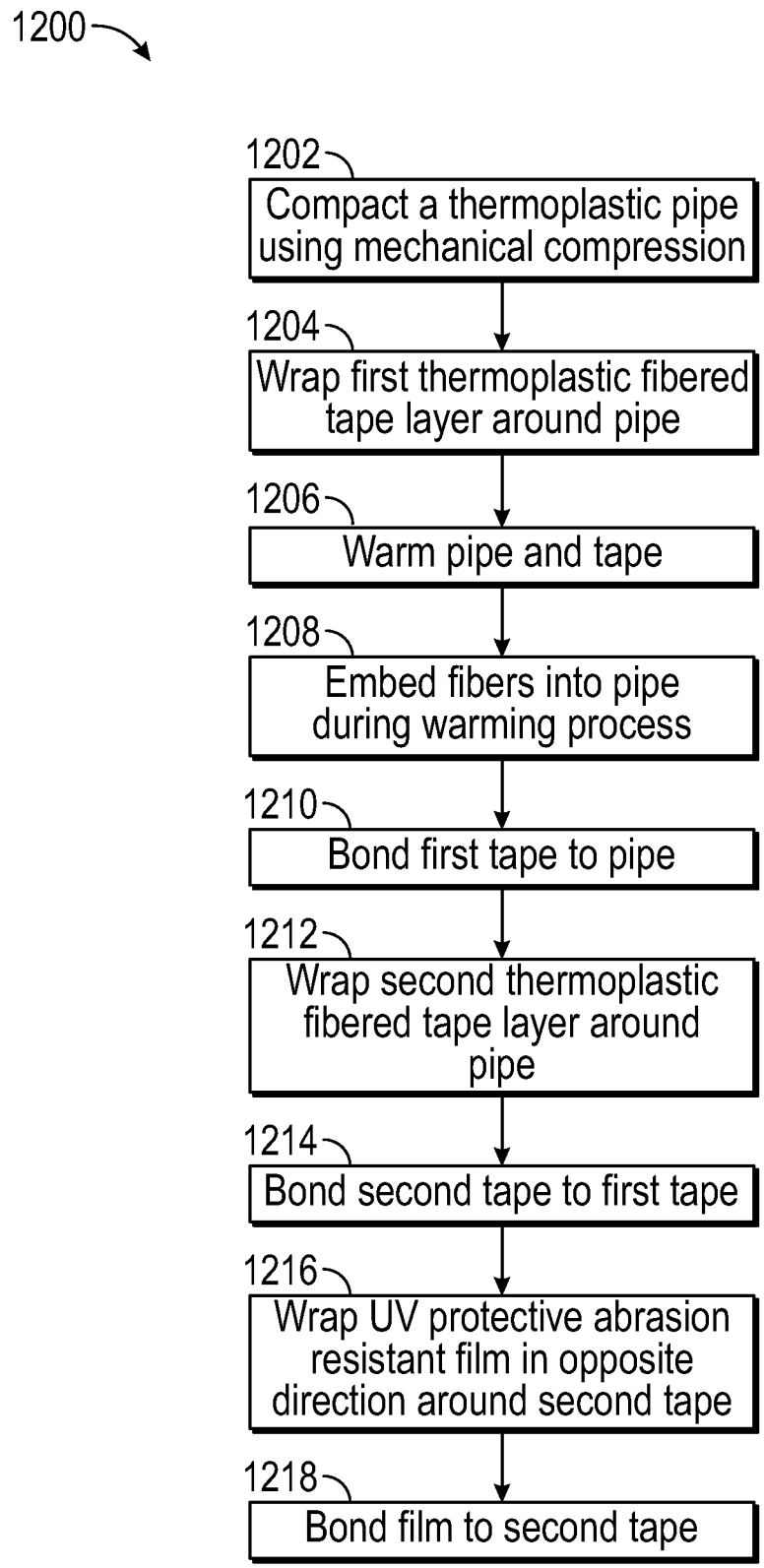
FIG. 12 is a flow chart of the method of manufacturing a reinforced thermoplastic pipe according to the present disclosure.

FIG. 12 is a flow chart of a method 12 for manufacturing a reinforced thermoplastic pipe according to one embodiment of the present disclosure. In step 1202, a thermoplastic pipe 1 is mechanically compressed to cause the pipe walls to contract around its circumference, such as by pulling the pipe through a die with a smaller inner diameter than the outer diameter of the pipe 1. In some embodiments, the contraction of the pipe 1 may be on the order of about 1 to 13 percent depending on wall thickness of the pipe 1. The compression force may be limited by the pipe 1 such that contraction of the pipe 1 does not cause permanent deformation of the perimeter of the pipe 1, as would be understood by a person of skill in the art. The amount of compression force or the inner diameter of the die may be selected to control the diameter of the pipe 1 when wrapping begins in step 1204. In step 1204, a thermoplastic continuous and taut fiber tape with a similar melting point to the pipe 1 is wrapped around the outer surface of the thermoplastic pipe while it remains in a contracted state. The timing of step 1204 may take into account the rate of expansion of the thermoplastic pipe one the compression force on the perimeter of the thermoplastic pipe has ceased. In step 1206, the tape and pipe are warmed to a surface temperature of high enough for the outer surface of the pipe and the tape to become molten but not runny as would be understood by a person of ordinary skill in the art. In step 1208, as the tape 10 and pipe 1 are warmed, the fibers 15 in the tape 10 are embedded into the pipe 1 due to thermal expansion of the pipe 1 and the taut characteristic of the wrapped fibers 15. In step 1210, as the tape 10 and pipe 1 cool, a homogenous bond occurs. In step 1212, a second thermoplastic continuous and taut fiber tape 18 is wrapped around the first tape in an opposite direction. In step 1214, heat is applied to the second tape 18 and when cooled, the second tape 18 homogenously bonds to the first tape 10. In one embodiment the surface of the second tape 18 is heated a surface temperature high enough for the outer surface of the pipe and the tape to become molten but not runny. In some embodiments, all bonding of the tape 10, 18, 19 may take place at the same time, e.g. step 1212 may be performed one or more times prior to step 1206 and step 1214 may be skipped. In step 1216, a UV protective/abrasion resistant film is wrapped or extruded around the second tape in an opposition direction from the second tape. In step 1218, the film is heated and when cooled the film bonds to the second tape.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. A method for manufacturing a reinforced pipe system for transporting a fluid, comprising:

contracting a thermoplastic pipe using a mechanical compression device;

wrapping or extruding a first fiber tape on a surface of the pipe while it remains at least partially contracted, said first fiber tape having continuous taut fibers;

securing ends of the first fiber tape to the ends of the pipe using a first heat source;

warming the first fiber tape and pipe using a second heat source;

embedding taut fibers into the pipe as the pipe is warmed; and bonding the first fiber tape to the pipe as the first fiber tape and pipe reach a thermal equilibrium.

2. The method of claim 1, wherein the pipe is made of one of: high-density polyethylene, polypropylene, and polyvinylidene fluoride.

3. The method of claim 1 wherein the first fiber tape includes continuous uni-directional fiberglass fibers.

4. The method of claim 1 wherein the first fiber tape is a polyethylene tape.

5. The method of claim 1 where the first heat source is an iron.

6. The method of claim 1 further comprising the step of wrapping or extruding a second fiber tape over a surface of the first fiber tape.

7. The method of claim 6 where in the first fiber tape and second fiber tape are comprised of polyethylene material.

8. The method of claim 6 further comprising the step of wrapping or extruding a film over the surface of the second fiber tape.

9. The method of claim 8 wherein the film is a UV protective film.

10. The method of claim 8 wherein the film is an abrasion resistant film.

11. The method of claim 1, wherein the mechanical compression is produced by drawing the thermoplastic pipe through a die.

* * * * *